(12) United States Patent
Pal et al.

(10) Patent No.: US 11,912,427 B2
(45) Date of Patent: Feb. 27, 2024

(54) THERMAL MANAGEMENT SYSTEM AND METHOD OF USE

(71) Applicant: Hamilton Sundstrand Corporation, Charlotte, NC (US)

(72) Inventors: Debabrata Pal, Hoffman Estates, IL (US); Tom A. Utecht, Cherry Valley, IL (US); Craig R. LeGros, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 72 days.

(21) Appl. No.: 17/321,345

(22) Filed: May 14, 2021

(65) Prior Publication Data

US 2022/0001997 A1 Jan. 6, 2022

Related U.S. Application Data

(60) Provisional application No. 63/025,948, filed on May 15, 2020.

(51) Int. Cl.
*F02C 7/18* (2006.01)
*B64D 33/08* (2006.01)

(52) U.S. Cl.
CPC ............... *B64D 33/08* (2013.01); *F02C 7/18* (2013.01); *F05D 2220/323* (2013.01); *F05D 2260/213* (2013.01)

(58) Field of Classification Search
CPC ............... B64D 33/08; F05D 2220/323; F05D 2260/213
See application file for complete search history.

(56) References Cited

U.S. PATENT DOCUMENTS

| | | | | |
|---|---|---|---|---|
| 5,072,893 | A * | 12/1991 | Chakravarty | G05D 1/0825 244/76 R |
| 5,105,875 | A * | 4/1992 | McArthur | H05K 7/20927 123/41.31 |
| 6,903,470 | B2 | 6/2005 | Doherty et al. | |
| 9,771,157 | B2 | 9/2017 | Gagne et al. | |
| 9,776,583 | B2 | 10/2017 | Edwards | |
| 10,125,684 | B2 * | 11/2018 | Yu | F02C 3/04 |
| 10,309,303 | B2 | 6/2019 | Bayles et al. | |

(Continued)

FOREIGN PATENT DOCUMENTS

EP 3179074 A1 6/2017
EP 3187715 A1 7/2017

OTHER PUBLICATIONS

Extended European search report issued in corresponding EP application No. 21174194.7, dated Oct. 13, 2021 (8 pages).

*Primary Examiner* — Todd E Manahan
*Assistant Examiner* — Rodolphe Andre Chabreyrie
(74) *Attorney, Agent, or Firm* — Locke Lord LLP; Scott D. Wofsy; Michael J. Pollack

(57) ABSTRACT

An aircraft engine thermal management system includes a body having a coolant passage in thermal communication with an electronic device, wherein the body and the electronic device are located in a first portion of the aircraft. A generator is fluidically connected by a coolant path to the coolant passage wherein the generator is located in a second portion of the aircraft, with at least a portion of the coolant path is located within a cooling location having a lower average temperature than either the first portion or the second portion of the aircraft.

12 Claims, 1 Drawing Sheet

(56) References Cited

U.S. PATENT DOCUMENTS

| | | | |
|---|---|---|---|
| 10,612,860 B2* | 4/2020 | Ribarov | F28D 9/0093 |
| 10,774,745 B2* | 9/2020 | Regnard | F02K 1/827 |
| 11,377,976 B2* | 7/2022 | Luschek | B22F 10/20 |
| 11,383,853 B2* | 7/2022 | Peace | F04D 29/584 |
| 2010/0071638 A1 | 3/2010 | Bulin | |
| 2010/0264759 A1* | 10/2010 | Shafer | H02K 9/197 |
| | | | 310/54 |
| 2017/0167382 A1* | 6/2017 | Miller | B64D 15/06 |
| 2017/0184028 A1* | 6/2017 | Sennoun | F02C 7/12 |
| 2018/0265206 A1* | 9/2018 | Himmelmann | B64D 27/24 |
| 2019/0186362 A1* | 6/2019 | Blumrich | F02C 7/12 |
| 2020/0031484 A1* | 1/2020 | Thomas | E05C 19/145 |

* cited by examiner

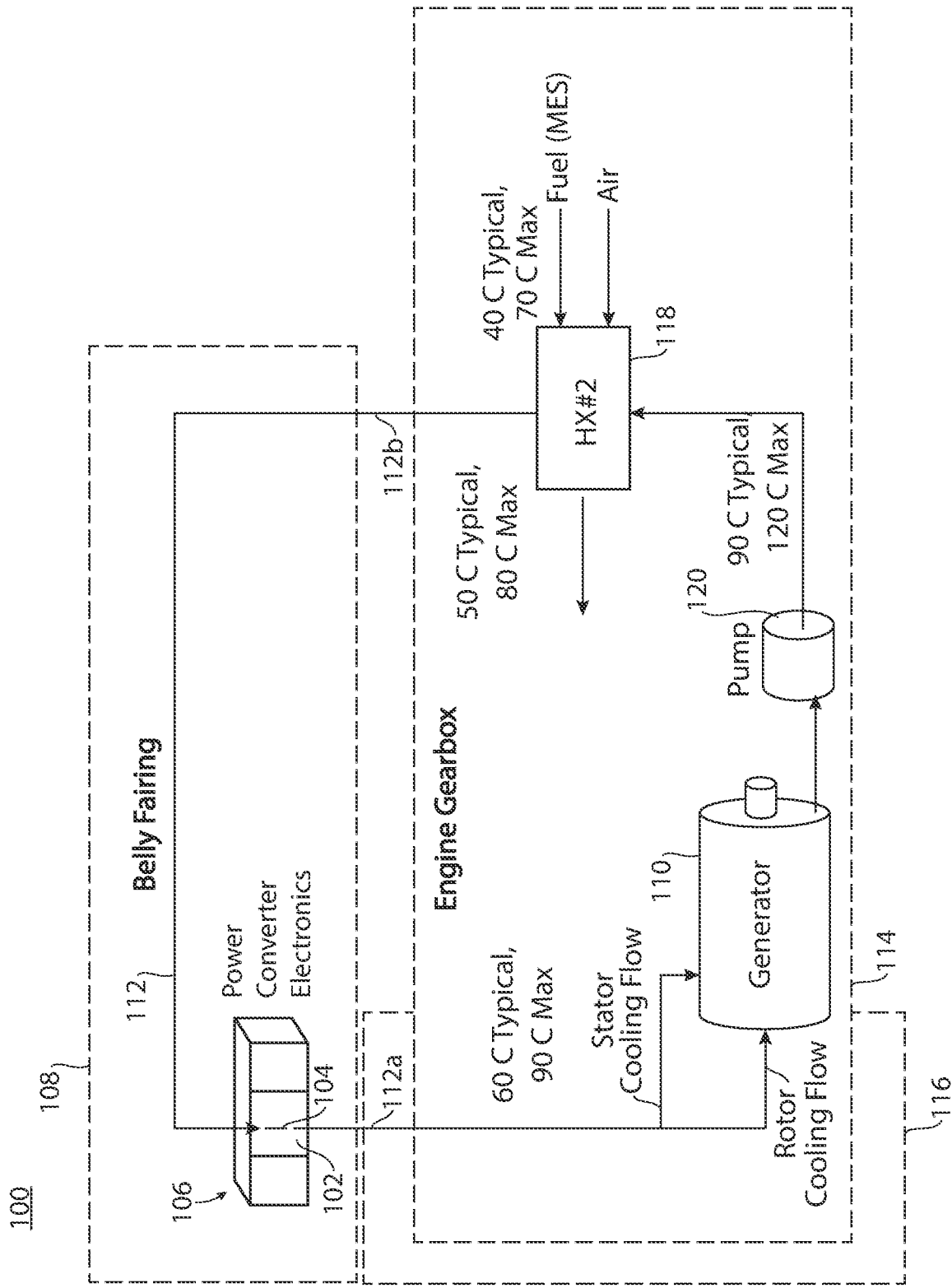

THERMAL MANAGEMENT SYSTEM AND METHOD OF USE

CROSS-REFERENCE TO RELATED APPLICATIONS

This application claims priority to and the benefit of U.S. Provisional Application No. 63/025,948, filed May 15, 2020, the entire contents of which are herein incorporated by reference in their entirety.

BACKGROUND

Technological Field

The present disclosure relates to electronics thermal management, and more particularly to thermal management of a device during startup.

Description of Related Art

A variety of devices are known for providing a cooling solution for power electronics. Power electronics devices are usually mounted on a heat spreader or a cold plate or to a heat sink in order to cool them during operation. Typical packaging configurations usually result in bulky designs, which has a relatively high volume, especially for air cooled cases. The aerospace industry demands lightweight and high compactness packaging solutions while also significantly increasing power level requirements. Further, typical configurations require bypass air to cool electronics. However, during startup or other motionless activities, no bypass air is available to provide cooling to electronics.

The conventional methods and systems have generally been considered satisfactory for their intended purpose, but are not appropriate any more when due to an increase in output powers of power electronics devices and volume and/or weight constrains remaining the same. However, there is still a need in the art for a thermal management system that is able to provide an appropriate amount of cooling prior during startup. The present disclosure may provide a solution for at least one of these remaining challenges.

SUMMARY OF THE INVENTION

An aircraft engine thermal management system includes a body having a coolant passage in thermal communication with an electronic device, wherein the body and the electronic device are located in a first portion of the aircraft. A generator is fluidically connected by a coolant path to the coolant passage wherein the generator is located in a second portion of the aircraft, with at least a portion of the coolant path is located within a cooling location having a lower average temperature than either the first portion or the second portion of the aircraft. The first portion of the aircraft is a belly fairing of the aircraft and the second portion of the aircraft is an engine nacelle of the aircraft.

The cooling location can be a wing of the aircraft, the coolant path can be an out-path and a return-path, wherein the out-path and the return-return can be fully within the wing of the aircraft.

A rotor and stator of the generator can be fluidically connected to the coolant passage. The heat exchanger can be located within a fan casing of an aircraft engine. The electronic device can be a bi-directional rectifier. A heat exchanger can be fluidically connected to the body and fluidically connected to the generator. The heat exchanger can be an air-coolant heat exchanger and a fuel-coolant heat exchanger. A pump can be located downstream of generator configured to drive oil out of the generator. The coolant can be an oil coolant.

A method of managing heat of an electronic device on an aircraft engine is also disclosed, including, pumping a coolant through a passage of a body coupled to an electronic device, transferring heat from the electronic device to the coolant within the passage of the body, pumping the coolant through an out-cooling line, cooling the coolant within the cooling line, pumping the coolant to a generator, transferring heat from the coolant to a first fluid within a heat exchanger, and pumping the coolant through a return-cooling line. Pumping coolant through the out-cooling can include passing coolant through a wing of the aircraft and pumping coolant through the return-cooling can include passing coolant through a wing of the aircraft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain FIGURES, wherein:

FIG. 1 is a schematic view of a thermal management system for an electronic device.

DETAILED DESCRIPTION

Reference will now be made to the drawings wherein like reference numerals identify similar structural features or aspects of the subject invention. For purposes of explanation and illustration, and not limitation, a partial view of an exemplary embodiment of a thermal management body in accordance with the invention is shown in FIG. 1 and is designated generally by reference character 100. The methods and systems of the invention can be used to provide a lighter and more efficient electronics thermal management system which houses electronics, such as bi-directional rectifier in a lower vibration area. Bi-directional rectifier converts DC to 3 phase AC power and supplies to the engine starter/generator in engine start mode. Bi-directional rectifier converts AC power generated by generator to high voltage DC power during generate mode.

FIG. 1 shows an aircraft engine thermal management system 100 including a body 102 having a coolant passage 104 in thermal communication with an electronic device 106, such as a bi-directional rectifier. The body 102 and the electronic device 106 are located in a belly fairing 108 of the aircraft. A generator 110 is fluidically connected by a coolant path 112 to the coolant passage 104 and receives coolant within the stator and rotor in order to cool the generator 110. The generator 110 is located in an engine nacelle 114 of the aircraft. Placing the generator 110 away from the electronic device 106 forces at least a portion of the coolant path 112 to go through the wing 116 of the aircraft. The wing 116 has lower average ambient temperature than either the belly fairing 108 or the engine nacelle 114, thus the coolant is cooled even further as it travels from the electronic device 106 to the generator 110. The coolant path can include an out-line 112*a* and a return line 112*b*, both of which travel through the wing 116 of the aircraft.

FIG. 1 further shows a heat exchanger 118 fluidically connected to the body 102 and to the generator 110. The heat exchanger 118 can be an air-coolant heat exchanger and a fuel-coolant heat exchanger. A pump 120 is to be located downstream of generator 110 to drive the coolant out of the generator 110 and through the system 100. The coolant can be an oil coolant.

A method of managing heat of an electronic device on an aircraft engine is also disclosed. The method includes pumping and cycling a coolant through the passage 104 of the body 102 coupled to the electronic device 106 and transferring heat from the electronic device 106 to the coolant within the passage 104 of the body 102. The method further includes pumping the coolant through and cooling the coolant within the coolant path 112, pumping the coolant to the generator 110, and transferring heat from the coolant to a first fluid, which can be fuel before startup and air after main engine startup within the heat exchanger 118.

The methods and systems of the present disclosure, as described above and shown in the drawings, provide for electronics thermal management system with superior properties including increased reliability and reduced size and weight. While the apparatus and methods of the subject disclosure have been shown and described with reference to embodiments, those skilled in the art will readily appreciate that changes and/or modifications may be made thereto without departing from the spirit and score of the subject disclosure.

What is claimed is:

1. An aircraft engine thermal management system comprising:
    a coolant path extending between a belly fairing and an engine nacelle of an aircraft;
    a generator power electronics module in thermal communication with a body, the body having a coolant passage, fluidically connected to the coolant path, wherein the generator power electronics module and the body are located in the belly fairing of the aircraft;
    a generator fluidically connected to the coolant path wherein the generator is located in the engine nacelle, and wherein at least a portion of the coolant path is located within a wing of the aircraft, having a lower average temperature than either the belly fairing or engine nacelle; and
    a heat exchanger fluidically connected to the body and fluidically connected to the generator by way of the coolant path.

2. The system of claim 1, wherein the generator power electronics module includes a bi-directional rectifier.

3. The system of claim 1, wherein the heat exchanger is an air-coolant heat exchanger and a fuel-coolant heat exchanger.

4. The system of claim 1, wherein a pump is located downstream of generator configured to drive oil out of the generator.

5. The system of claim 1, wherein the coolant is an oil coolant.

6. The system of claim 1, wherein the coolant path includes an out-path and a return-path, wherein the out-path and the return path are within the wing of the aircraft.

7. The system of claim 1, wherein a rotor of the generator is fluidically connected to the coolant passage.

8. The system of claim 1, wherein a stator of the generator is fluidically connected to the coolant passage.

9. The system of claim 1, wherein the heat exchanger is located within a fan casing of an aircraft engine.

10. A method of managing heat of an electronic device on an aircraft engine comprising:
    pumping a coolant through a passage of a body coupled to a generator power electronics module, housed in a belly fairing of the aircraft;
    transferring heat from the electronic device to the coolant within the passage of the body;
    pumping the coolant through an out-cooling line;
    cooling the coolant within the cooling line;
    pumping the coolant to a generator, housed within an engine nacelle of the aircraft;
    transferring heat from the generator to the coolant;
    transferring heat from the coolant to a first fluid within a heat exchanger; and
    pumping the coolant through a return-cooling line.

11. The method of claim 10, wherein pumping coolant through the out-cooling line includes passing coolant through a wing of the aircraft.

12. The method of claim 10, wherein pumping coolant through the return-cooling line includes passing coolant through a wing of the aircraft.

* * * * *